United States Patent
Kifuku et al.

(10) Patent No.: US 7,165,646 B2
(45) Date of Patent: Jan. 23, 2007

(54) STEERING CONTROL APPARATUS (75) Inventors: Takayuki Kifuku, Tokyo (JP); Hiroyuki Kozuki, Tokyo (JP); Yasuaki Hori, Tokyo (JP)

(73) Assignee: Itsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/098,433

(22) Filed: Apr. 5, 2005

(65) Prior Publication Data

US 2006/0076182 A1  Apr. 13, 2006

(30) Foreign Application Priority Data

Sep. 10, 2004 (JP) ............... 2004-263724

(51) Int. Cl.
*B62D 5/04* (2006.01)
(52) U.S. Cl. ......................... 180/446; 701/42
(58) Field of Classification Search ................ 180/443, 180/446; 701/41, 42
See application file for complete search history.

(56) References Cited

U.S. PATENT DOCUMENTS

| 6,070,692 | A  | * | 6/2000  | Nishino et al. | ............. | 180/443 |
| 6,687,590 | B1 | * | 2/2004  | Kifuku et al. | ................ | 701/43 |
| 6,831,477 | B1 | * | 12/2004 | Fukusumi et al. | ........... | 324/772 |
| 6,992,449 | B1 | * | 1/2006  | Iwami et al. | ................ | 318/432 |
| 2005/0159866 | A1 | * | 7/2005 | Takeuchi et al. | .............. | 701/41 |

FOREIGN PATENT DOCUMENTS

| JP | 4-031171 A    | 2/1992  |
| JP | 2000-190862 A | 7/2000  |
| JP | 2000-255442 A | 9/2000  |
| JP | 2001-130424 A | 5/2001  |
| JP | 2002-67988 A  | 3/2002  |
| JP | 2002-354871 A | 12/2002 |
| JP | 2003-291837 A | 10/2003 |

* cited by examiner

*Primary Examiner*—Kevin Hurley
(74) *Attorney, Agent, or Firm*—Sughrue Mion, PLLC (57) ABSTRACT

A steering control apparatus of a simple configuration is adaptable so as to construct a redundant system from an input to an output system at low cost in a reliable manner. A torque sensor detects a steering torque, and a motor (3) provides torque to a steering system. A motor drive circuit (56) drives the motor, and a steering control section (53a) calculates at least a target current for the motor based on the steering torque. A motor control section (53b) provides an instruction to the motor drive circuit (56) based on the target current. A steering control verification section (54a) verifies an operation of the steering control section (53a) based on the steering torque and the target current. A motor control verification section (54b) verifies an operation of the motor control section (53b) based on a predetermined state quantity of the motor drive circuit (56) or the motor (3).

22 Claims, 7 Drawing Sheets

STEERING CONTROL APPARATUS

BACKGROUND OF THE INVENTION

1. Field of the Invention

The present invention relates to a steering control apparatus for a vehicle such as an automobile.

2. Description of the Related Art

In recent years, a steering control apparatus is being put into practical use which has a function added to improve the steerability or steering stability of a vehicle by correcting an output torque of a motor in an electric power steering apparatus on the basis of a correction signal which is based on a signal from a predetermined vehicle state quantity.

In conventional steering control apparatuses, a redundant system construction adapted to the above-mentioned apparatus is achieved by monitoring steering control in accordance with not only the steering torque but also the correction signal (see, for instance, a first patent document: Japanese patent application laid-open No. 2000-190862).

That is, the conventional apparatus as described in the first patent document includes a motor for applying an assist steering force to a steering system, a torque sensor for detecting the steering torque of the steering system, a steering control section for calculating a target current that is obtained by correcting a target current calculated based on the steering torque detected by the torque sensor on the basis of a correction signal which is based on a signal from a predetermined vehicle state quantity, and a steering control verification section for verifying the presence or absence of abnormality in the steering control section by making a comparison at least between a reference value based on the steering torque and the target current. In addition, two kinds of reference values are set so that when a correction signal is generated, switching is made between the two kinds of reference values.

In the construction of the apparatus described in the above-mentioned first patent document, no reference is made to a method for verifying a motor control section that serves to perform arithmetic calculations for driving the motor based on a target current.

Accordingly, another conventional steering control apparatus has been proposed in which a motor control verification section for verifying an abnormality of a motor control section is provided separately from a steering control verification section (see, for instance, a second patent document: Japanese patent application laid-open No. 2002-67988).

That is, the conventional apparatus described in the second patent document includes a steering control verification section for determining an abnormality of a steering control section by making a comparison between steering torque and a target current, and a motor control verification section for determining an abnormality of a motor control section by making a comparison between a target current and a drive signal supplied to the motor drive circuit. In this case, the motor control verification section monitors a correlation between the direction of the target current and a motor driving direction instruction signal.

For example, in case where an H type bridge circuit is used as the motor drive circuit, the direction of the target current and the motor driving direction instruction signal are in one to one correspondence with each other, so the motor driving direction instruction signal can be easily generated. Accordingly, in the steering control apparatus using a DC motor adapted to be driven by such an H bridge circuit, the motor drive circuit can be monitored by using the conventional apparatus as described in the above-mentioned second patent document.

In conventional steering control apparatuses, when it is difficult to generate a motor driving direction instruction signal from a signal supplied to a motor drive circuit even with the use of the motor control verification section described in the above-mentioned second patent document, such as when a brushless motor is driven by a three-phase inverter, it is necessary to output a motor driving direction instruction signal from a separate microcomputer port for instance, thus resulting in a problem that it becomes difficult to monitor the motor drive circuit.

SUMMARY OF THE INVENTION

The present invention is intended to solve the problem as referred to above, and has for its object to obtain a steering control apparatus which can be adapted, with a simple configuration, to a control apparatus operating based on a vehicle state quantity signal, i.e., a steering control apparatus having a relatively low correlation between steering torque and motor torque, and in which a verification section (redundant system) for verifying from an input system to an output system can be constructed at low cost in a reliable manner.

Another object of the present invention is to obtain a steering control apparatus which can be adapted, with a simple configuration, to a three-phase motor for which it is difficult to generate a motor driving direction instruction signal from a motor drive circuit, and in which a verification section (redundant system) for verifying from an input system to an output system can be constructed at low cost in a reliable manner.

A steering control apparatus according to the present invention includes: a torque sensor for detecting driver's steering force as a steering torque; a motor for providing torque to a steering system; a motor drive circuit for driving the motor; a steering control section for calculating at least a target current for the motor based on the steering torque; a motor control section for providing an instruction to the motor drive circuit based on the target current; a steering control verification section for verifying an operation of the steering control section based on the steering torque and the target current; and a motor control verification section for verifying an operation of the motor control section based on a predetermined state quantity of the motor drive circuit or the motor.

According to the present invention, it is possible to make adaptation to a steering control apparatus having a relatively low correlation between steering torque and motor torque, with the use of a simple configuration. Also, a verification section (redundant system) for verifying from an input system to an output system can be constructed at low cost in a reliable manner.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1.

Figure 1:
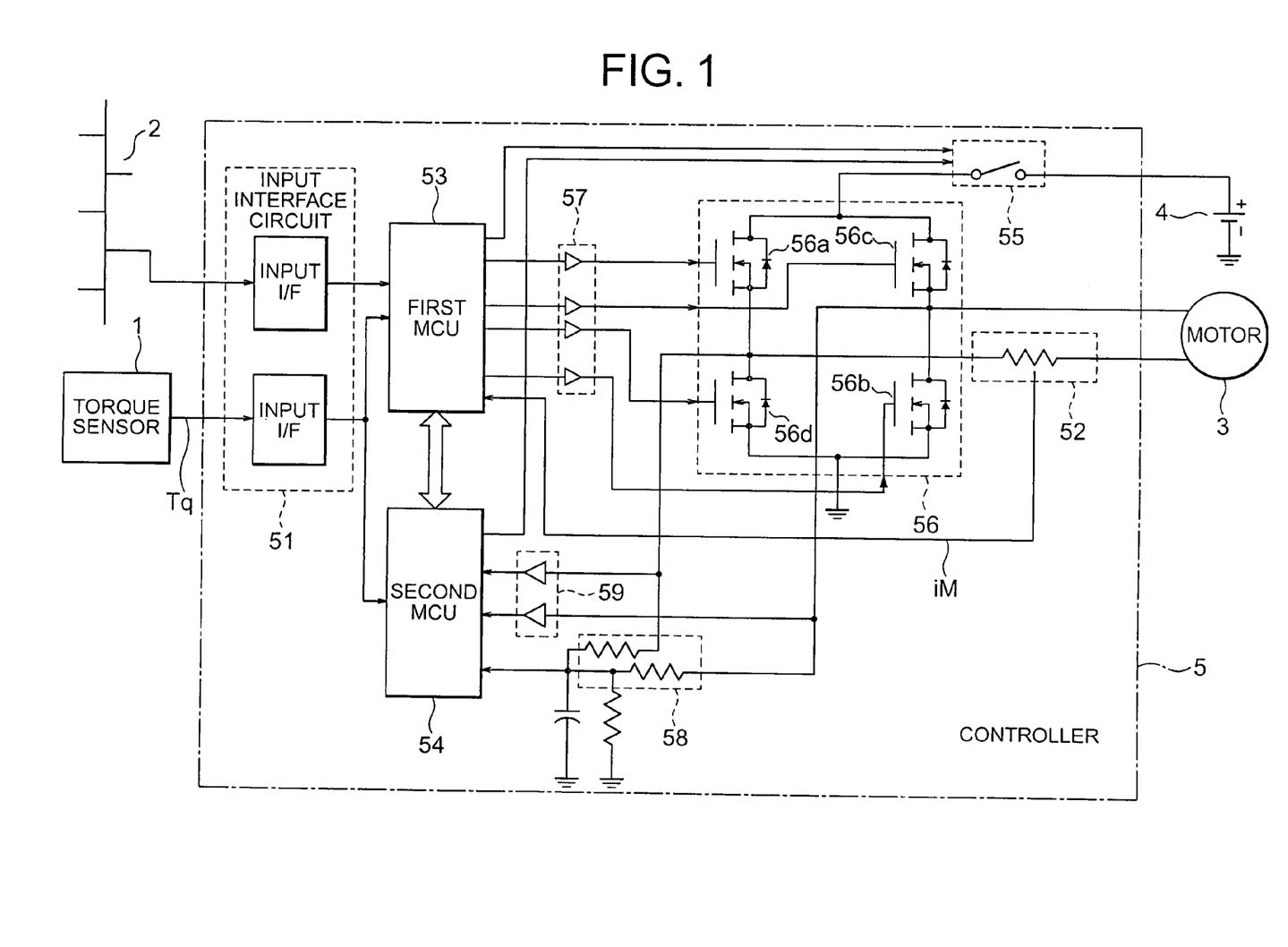
FIG. 1 is a circuit configuration diagram showing a steering control apparatus together with hardware blocks according to a first embodiment of the present invention.
Figure 2:
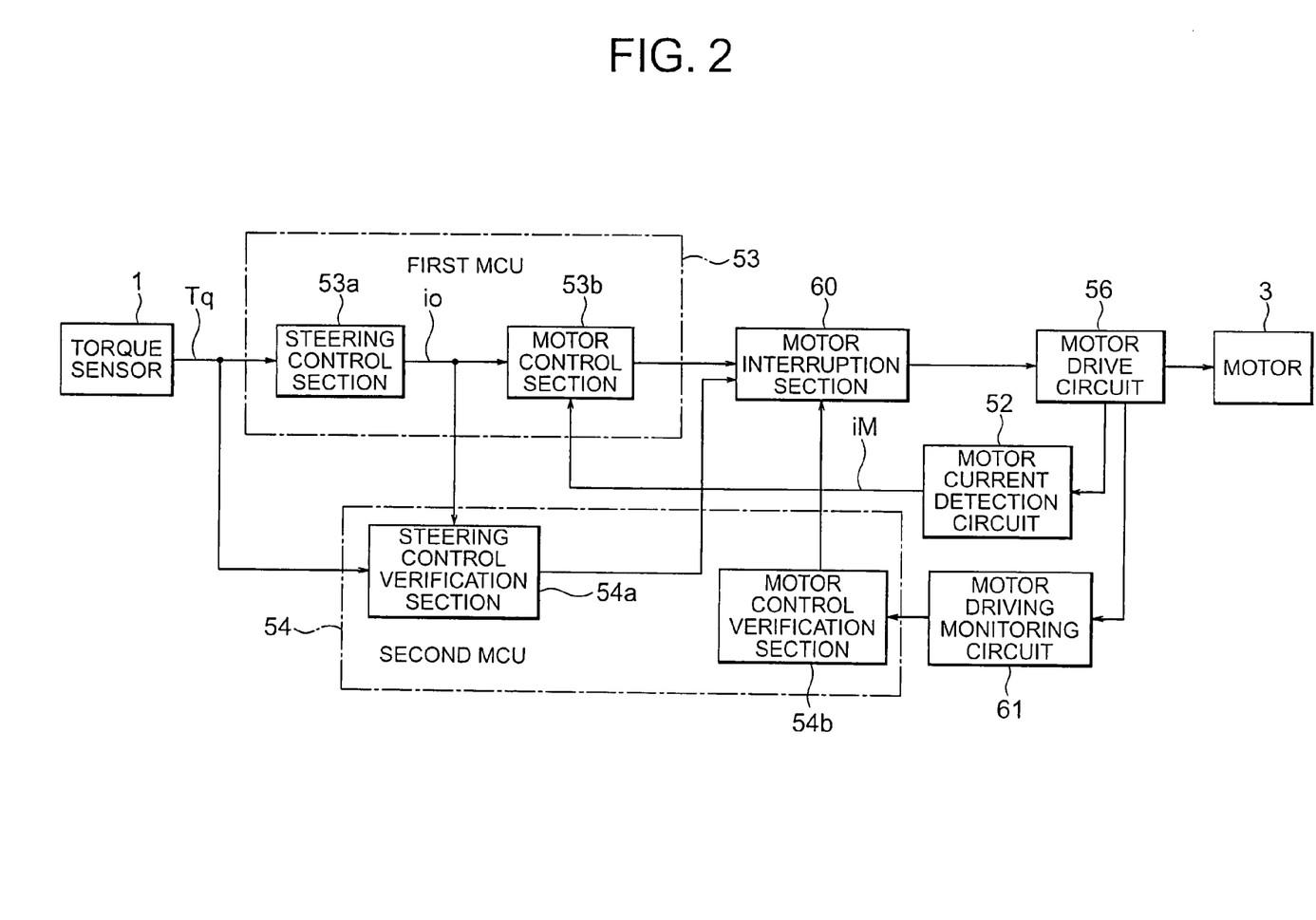
FIG. 2 is a block diagram showing a functional configuration to explain the software operation of a controller according to the first embodiment of the present invention.

FIG. 1 is a circuit configuration diagram that illustrates a steering control apparatus according to a first embodiment of the present invention, wherein an example of a hardware configuration when the present invention is applied to a controller of an electric power steering system in a motor vehicle is shown. FIG. 2 is a block diagram that illustrates a functional configuration to describe the software operation of the controller in FIG. 1.

In FIG. 1, the steering control apparatus installed on a vehicle includes a controller 5, a torque sensor 1 electrically connected to the controller 5, a CAN (Control Area Network) 2, a motor 3, and a battery 4. The torque sensor 1 detects a steering force applied by the driver of the vehicle to an unillustrated steering wheel thereof as a steering torque Tq, and outputs a detection signal of the steering torque Tq to the controller 5.

The CAN 2 electrically connects the controller 5 to various electric or electronic component parts within the vehicle through a network. The motor 3 is in the form of a DC motor that is driven to operate under the control of the controller 5, so that torque is provided to the steering system (not shown) of the vehicle thereby to assist the driver's steering force or effort. The battery 4 supplies electric power to the controller 5.

The controller 5 includes an input interface circuit 51, a motor current detection circuit 52, a first and a second microcontroller (MCU) 53, 54, a switch element 55, a motor drive circuit 56, a gate drive circuit 57, a motor voltage monitoring circuit 58, and a PWM monitoring circuit 59.

The input interface circuit 51 inputs the steering torque Tq from the torque sensor 1, network outputs from the CAN 2 and so on to the MCUs 53, 54. The motor current detection circuit 52 detects a motor current iM supplied to the motor 3 and inputs it to the first MCU 53.

The first MCU 53 controls the motor 3 of the electric power steering system while controlling the motor current iM based on input information from the input interface circuit 51 in a feedback manner. The second MCU 54 cooperates with the first MCU 53 to verify the operation of the electric power steering apparatus.

The switch element 55 normally functions to supply electric power from the battery 4 to the motor drive circuit 56, but is turned off, upon occurrence of failure, by the first or second MCU 53 or 54 to interrupt the electric power supplied to the motor 3. The motor drive circuit 56 is in the form of a bridge circuit comprising power MOSFETs 56a through 56d, and operates to drive the motor 3 under the control of the first MCU 53.

The gate drive circuit 57 power amplifies port outputs of the first MCU 53, and drives the respective gates of the power MOSFETs 56a through 56d. The motor voltage monitoring circuit 58 monitors a voltage impressed on the motor 3 when the motor drive circuit 56 drives the motor 3, and inputs the detected voltage to the second MCU 54. The PWM monitoring circuit 59 monitors the pulse-shaped voltage impressed on the motor 3 when the motor 3 is driven to rotate, and inputs the thus detected PWM voltage to the second MCU 54.

In FIG. 2, the same or like parts or elements as those FIG. 1 are identified by the same symbols while omitting a detailed description thereof. Here, note that the illustration of a part of the configuration in FIG. 1 is omitted.

A motor interruption section 60 is inserted between the first and second MCUs 53, 54 and the motor 3, and serves to interrupt the output of the motor 3 in an appropriate manner. The motor interruption section 60 corresponds to the switch element 55 and the gate drive circuit 57 in FIG. 1.

A motor driving monitoring circuit 61 is inserted between the motor drive circuit 56 and the second MCU 54, and inputs a detected voltage and a detected PWM voltage for monitoring the motor drive circuit 56 or the driving state of the motor 3 to the second MCU 54. The motor driving monitoring circuit 61 corresponds to the motor voltage monitoring circuit 58 and the PWM monitoring circuit 59 in FIG. 1.

In FIG. 2, the first MCU 53 includes a steering control section 53a and a motor control section 53b which are respectively implemented as software. The steering control section 53a calculates a target current io for the motor 3 on the basis of the steering torque Tq from the torque sensor 1.

The motor control section 53b controls the current supplied to the motor 3 based on the target current io calculated by the steering control section 53a and the motor current iM detected by the motor current detection circuit 52 in a feedback manner. That is, the motor control section 53b generates an instruction signal for driving the motor drive circuit 56, and provides it to each gate of the power MOSFETs 56a through 56d in the motor drive circuit 56.

The second MCU 54 includes a steering control verification section 54a and a motor control verification section 54b which are respectively implemented as software. The steering control verification section 54a verifies the validity or normality of the operation of the steering control section 53a on the basis of the steering torque Tq and the target current io, and drives the motor interruption section 60 to interrupt the electric power supplied to the motor 3 when it is determined that the value of the target current io is abnormal.

The motor control verification section 54b verifies the validity or normality of the operation of the motor control section 53b on the basis of the detected voltage and the detected PWM voltage (prescribed state quantity) from the motor driving monitoring circuit 61, and drives the motor interruption section 60 to interrupt the electric power supplied to the motor 3 when it is determined that either of the detected values is abnormal.

More specifically, the steering control verification section 54a in the second MCU 54 sets reference values for comparison verification of the target current io on the basis of the steering torque Tq, and a determination is made that the steering control section 53a is abnormal, when the target current io exceeds a reference value.

Specifically, the steering control verification section 54a sets a plurality of reference values for comparison verification of the target current io on the basis of the steering torque Tq, and the second MCU 54 selects one from among the plurality of reference values in accordance with an instruction from the first MCU 53 (see FIG. 5 to be described later), and makes a determination that the steering control section 53a is abnormal, when the target current io exceeds the reference value thus selected.

Figure 5:
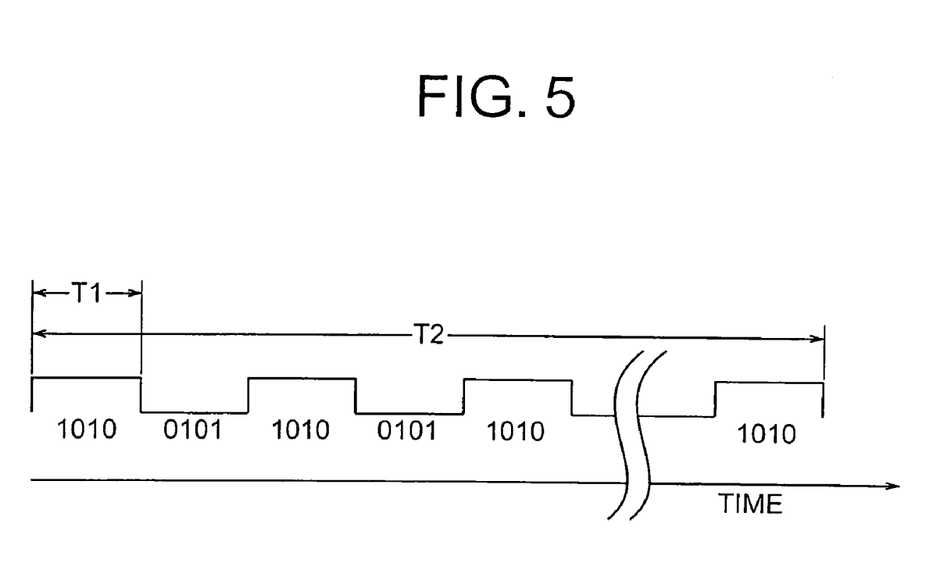
FIG. 5 is an explanatory view showing an example of a signal sent from a first MCU to a second MCU according to the first embodiment of the present invention.

At this time, the period of time in which at least one of the plurality of reference values is in a selected state is restricted (see time T2 in FIG. 5). In addition, the first MCU 53 provides an instruction for selecting a reference value to the second MCU 54 by means of a predetermined periodic signal (see cycle or period T1 in FIG. 5).

Also, the motor control verification section 54b verifies the operation of the motor control section 53b on the basis of the voltage impressed on the motor 3 by the motor drive circuit 56 (the detected voltage of the motor driving monitoring circuit 61). That is, when a sum of the values of voltages impressed on the respective terminals of the motor 3 by the motor drive circuit 56 shows to be outside a predetermined range, the motor control verification section 54b makes a determination that the motor control section 53b is abnormal.

The motor control section 53b drives the motor 3 in a PWM fashion, and when the cycle or period of the PWM signal impressed on the respective terminals of the motor 3 by the motor drive circuit 56 shows to be outside a predetermined range, the motor control verification section 54b makes a determination that the motor control section 53b is abnormal. In addition, the motor control verification section 54b verifies the operation of the motor control section 53b on the basis of the current supplied to the motor 3.

Figure 3:
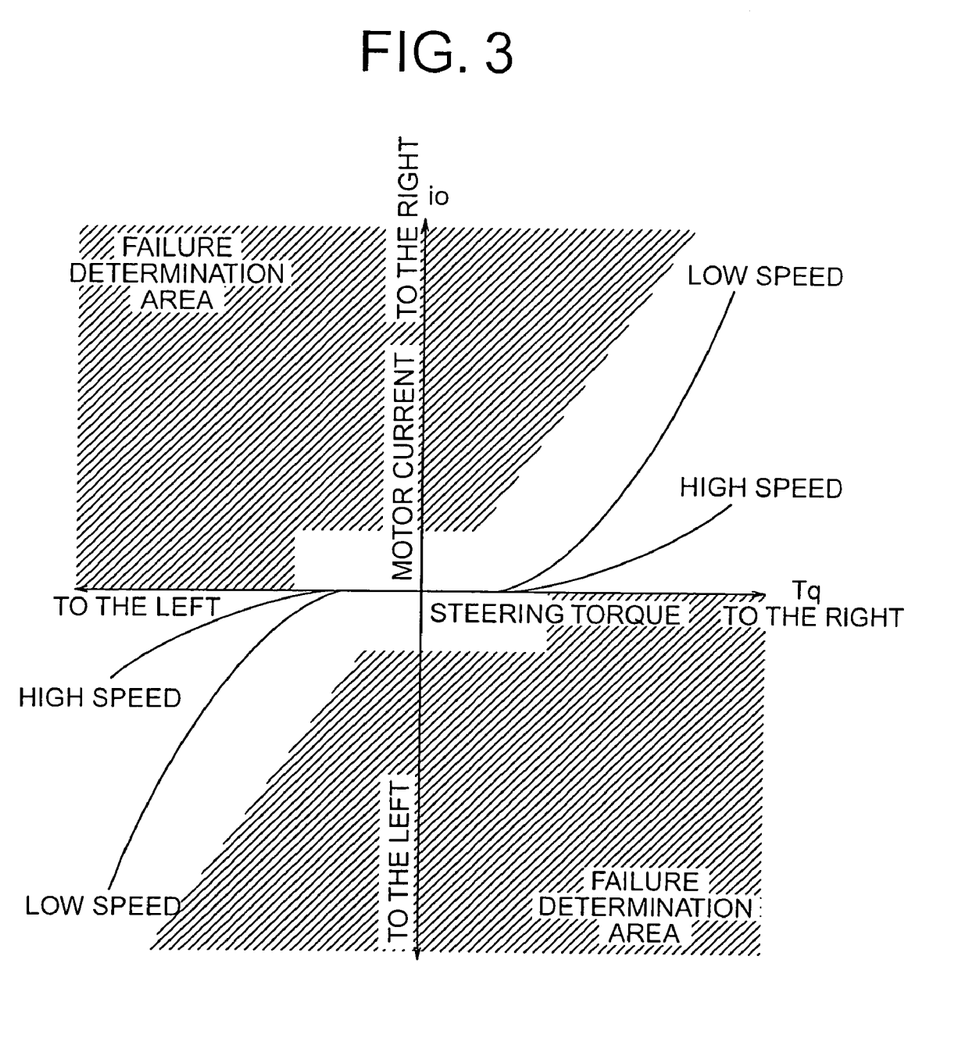
FIG. 3 is an explanatory view showing a relation among steering torque, motor current, and a failure determination condition when the steering control apparatus according to the first embodiment of the present invention operates normally as an electric power steering system.

Now, the concrete operation of the steering control apparatus according to the first embodiment of the present invention as illustrated in FIGS. 1 and 2 will be described while referring to FIG. 3 through FIG. 5. FIG. 3 is an explanatory view that illustrates a relation among the steering torque Tq, the motor current iM, and a failure determination condition (area) when the steering control apparatus according to the first embodiment of the present invention operates normally as an electric power steering system.

Figure 4:
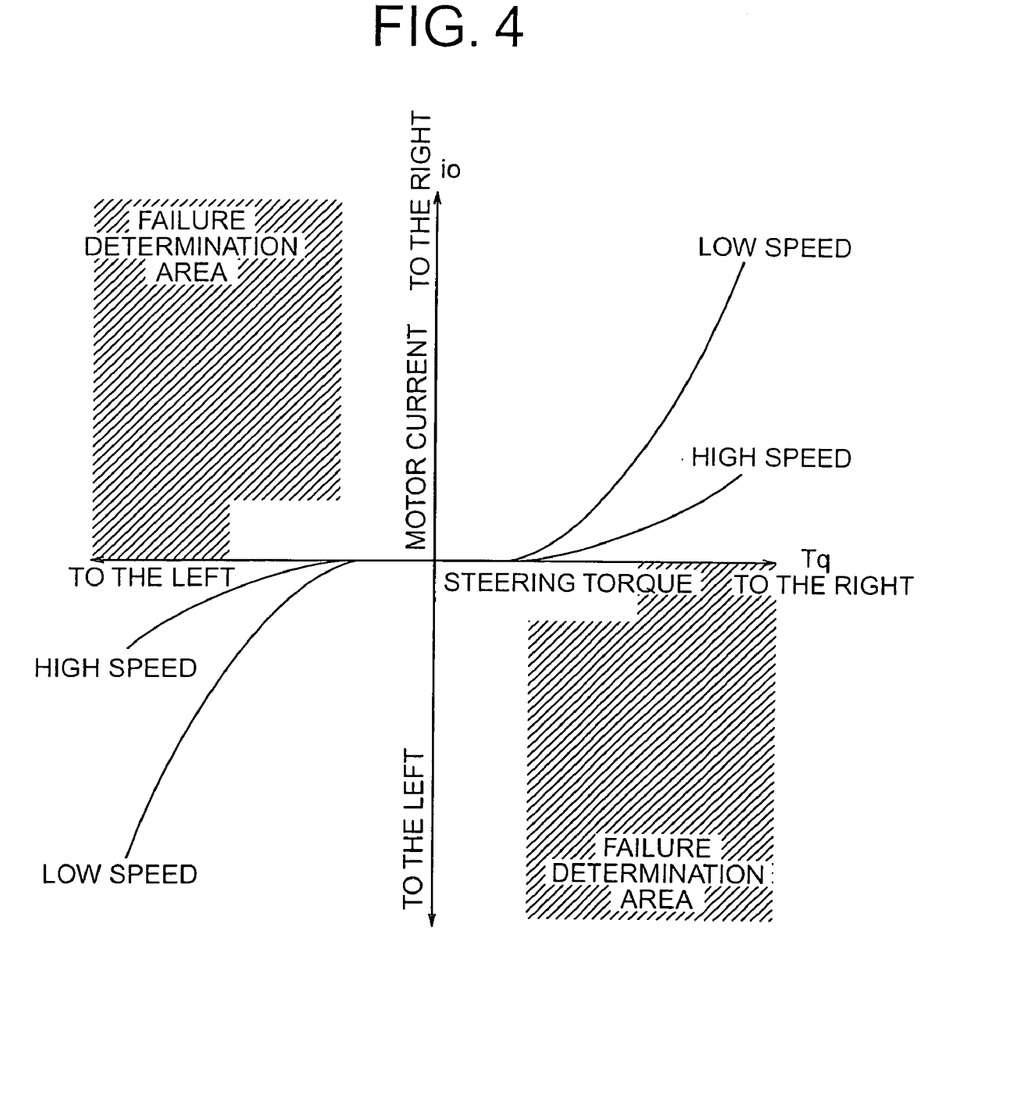
FIG. 4 is an explanatory view showing a relation among steering torque, motor current, and a failure determination condition when the steering control apparatus according to the first embodiment of the present invention performs steering stabilization control.

Similarly, FIG. 4 is an explanatory view that illustrates a relation among the steering torque Tq, the motor current iM and a failure determination condition (area) when the steering control apparatus according to the first embodiment of the present invention performs steering stabilization control. FIG. 5 is an explanatory view that illustrates an example of a signal sent from the first MCU 53 to the second MCU 54 according to the first embodiment of the present invention.

First, the input interface circuit 51 inputs the steering torque Tq from the torque sensor 1 and a vehicle state quantity (vehicle speed, etc.) from the CAN 2 to the MCUs 53, 54, and the steering control section 53a in the first MCU 53 calculates, from the steering torque Tq, the target current io to be supplied to the motor 3 based, for instance, on the characteristic of FIG. 3.

Also, the motor control section 53b in the first MCU 53 controls the current supplied to the motor 3 based on the target current io and the motor current iM detected by the motor current detection circuit 52 in a feedback manner by using an appropriate control algorithm such as PI control, etc. That is, the motor control section 53b drives the motor drive circuit 56 in the PWM fashion through the gate drive circuit 57 in the motor interruption section 60.

Here, note that the PWM driving of the motor drive circuit 56 is a so-called complementary PWM driving in which the sum of the voltages impressed on the respective terminals of the motor 3 becomes substantially equal to the value of the voltage supplied by the battery 4 to the motor drive circuit 56, as will be described later. The motor 3 is connected with the steering system, so that it generates a desired torque to reduce the steering force required of the driver when a desired current is supplied to the motor 3 through the motor drive circuit 56.

Further, the first MCU 53 sends the target current io to the second MCU 54 by means of a predetermined communication protocol, so that the steering control verification section 54a in the second MCU 54 makes a comparison between the target current io and the steering torque Tq from the torque sensor 1 so as to verify whether there is a predetermined correlation therebetween.

At this time, the steering control verification section 54a verifies whether the steering force of the driver and the output torque of the motor 3 are of the same direction and have a prescribed correlation, by verifying whether the target current io and the steering torque Tq are outside a range (i.e., are in a normal range) indicated by the failure determination area (see shaded portions) in FIG. 3 for instance.

When it is determined that the target current io and the steering torque Tq are within the failure determination area, the steering control verification section 54a decides the occurrence of abnormality, and provides an instruction for interrupting the current supplied to the motor 3 to the motor interruption section 60. As a result, the switch element 55 in the motor interruption section 60 is opened so that the current supplied from the battery 4 to the motor drive circuit 55 is interrupted, thus cutting off the current supplied to the motor 3.

Here, note that in steering control apparatuses of recent years, a technique is being put into practical use which has an additional function to correct the motor output torque of an electric power steering apparatus (assist torque) by a correction signal based on a signal representative of a prescribed vehicle state quantity so as to improve the steerability or steering stability of a vehicle. In this kind of steering control apparatus, in order to stabilize the vehicle regardless of driver's steering operation, control is performed in such a manner as to reduce the correlation between the driver's steering torque Tq and the assist torque of the motor 3. Accordingly, the steering torque Tq and the motor assist torque can be put into a relation of opposite directions, but it is not desirable to always permit the motor 3 to be driven to rotate in a direction opposite to the direction of the steering torque Tq since this can disturb the driver's steering operation resulting from a failure of the apparatus or the like.

Accordingly, in the first embodiment of the present invention, when control for improving the steering stability of the vehicle is started, the failure determination area (see shaded portions) is reduced to increase a normal operation area, as shown in FIG. 4 for example. In this case, the first MCU 53 sends to the second MCU 54 an instruction for steering stabilization control by means of a signal having a length of 4 bits and a period of T1 (e.g., "1010", "0101") as shown in FIG. 5 for example.

The second MCU 54, upon receipt of the instruction for steering stabilization control, temporarily reduces the failure determination area of the steering control verification section 54a (temporarily expand the normal area), as shown in FIG. 4. In addition, the second MCU 54 verifies whether an instruction signal from the first MCU 53 is sent periodically (at the period of T1), and restores the failure determination area to the normal characteristic of FIG. 3 when the period of the instruction signal becomes abnormal.

For example, if the instruction signal from the first MCU 53 is "0000", the second MCU 54 sets the failure determination area to the normal characteristic of FIG. 3, whereas if it is "0101", the second MCU 54 sets the failure determination area to the steering stabilization characteristic of FIG. 4. However, when an instruction signal "1010" has not been sent after the lapse of T1 seconds even if the failure determination area is set to the steering stabilization characteristic of FIG. 4, the setting is returned to the normal characteristic of FIG. 3. That is, at the normal time, the first MCU 53 sends out an instruction signal "0000" at each predetermined period (T1 seconds), but at the time of steering stabilization control, it alternately sends out instruction signals "0101", "1010" (see FIG. 5) at the predetermined period (T1 seconds) over a predetermined maximum time duration T2.

In this regard, note that the condition for executing steering stabilization control should be for an extremely limited time duration, for example, such as when the driver performs a counter steering operation while the vehicle is negotiating a corner, and hence it is considered abnormal in case where the steering stabilization control continues over a long period of time. Accordingly, even in case where the instruction signals "1010", "0101" are periodically sent from the first MCU 53, the failure determination area of the steering control verification section 54a is returned to the normal characteristic of FIG. 3 when the duration of the instruction exceeds a prescribed time T2 (>T1). With the above-mentioned processing, it is possible to prevent the failure determination area from being inadvertently switched into the setting of FIG. 4.

Further, the motor control section verification section 54b in the second MCU 54 verifies the operation of the motor control section 53b in the first MCU 53 on the basis of the detection signal from the motor driving monitoring circuit 61. First of all, the motor control section verification section 54b carries out such a verification on the basis of the detected voltage from the motor voltage monitoring circuit 58 in the motor driving monitoring circuit 61.

As stated above, the motor drive circuit 56 is driven in a complementary PWM fashion so that when driving the two power MOSFETs 56a, 56b at a driving duty ratio $\alpha$, it drives the other two power MOSFETs 56c, 56d at a driving duty ratio $(1-\alpha)$.

Accordingly, in case where the battery 4 supplies a battery voltage VB to the motor drive circuit 56, if a voltage of $\alpha \times VB$ is impressed on one terminal of the motor 3, a voltage of $(1-\alpha) \times VB$ is impressed on the other terminal of the motor 3. Here, note that if voltage drops in wiring and in the respective power MOSFETs 56a through 56d are ignored, the sum of the respective terminal voltages of the motor 3 always becomes equal to the battery voltage VB without regard to the driving duty ratio $\alpha$.

Moreover, the motor voltage monitoring circuit 58 is constructed such that it adds the respective terminal voltages of the motor 3 to one another, as shown in FIG. 1, to remove the PWM carrier component thereby to provide an average voltage. Accordingly, the motor control verification section 54b can verify the validity or normality of the operation of the motor control section 53b by determining whether the detected voltage from the motor voltage monitoring circuit 58 in the motor driving monitoring circuit 61 corresponds to the battery voltage VB.

Specifically, when the detected voltage from the motor voltage monitoring circuit 58 deviates from a predetermined range that includes the battery voltage VB as a center value, the motor control verification section 54b determines that the motor control section 53b, the gate drive circuit 57 or the motor drive circuit 56 is abnormal, and outputs an interruption instruction signal to the switch element 55 in the motor interruption section 60. As a result, the switch element 55 is opened to interrupt the current supplied to the motor 3.

The motor control verification section 54b further verifies the validity or abnormality of the operation of the motor control section 53b on the basis of the detected PWM voltage from the PWM monitoring circuit 59 in the motor driving monitoring circuit 61. Here, note that since the PWM carrier frequency in the motor drive circuit 56 should be constant, the motor control verification section 54b can verify the validity or normality of the operation of the motor control section 53b by monitoring the period of the PWM signal on the basis of the detected PWM voltage.

Specifically, when the period of the PWM signal deviates from the predetermined range including a set value as its center, the motor control verification section 54b determines that the motor control section 53b, the gate drive circuit 57 or the motor drive circuit 56 is abnormal, and interrupts the current supplied to the motor 3, as in the above-mentioned case.

As described above, in the electric power steering apparatus (FIG. 1 and FIG. 2) according to the first embodiment of the present invention, the second MCU 54 has such a function that can be achieved by a small-scale microcontroller and hardware for monitoring, and can verify, based on the input information (steering torque Tq) of the controller 5, the main arithmetic calculation and circuit operation of the first MCU 53 until a drive signal for the motor 3 is generated.

In addition, the second MCU 54 performs operation verification in parallel to the operation of the first MCU 53 without disturbing the control operation of the first MCU 53 from an ordinary electric power steering control operation to a vehicle steering stabilization control operation, thus making it possible to achieve an excellent steering control apparatus.

Furthermore, according to the configuration of FIG. 2, the first MCU 53 is provided with the steering control section 53a and the motor control section 53b, and the second MCU 54 is provided with the steering control verification section 54a and the motor control verification section 54b. Thus, this construction is suitable for use with the case in which a steering control system is constructed by using the first MCU 53 (main MCU) with a relatively fast computing speed and the second MCU 54 with a relatively slow computing speed.

Although in the above-mentioned first embodiment, the switch element 55 is inserted between the battery 4 and the motor drive circuit 56, it may instead be inserted between the motor drive circuit 56 and the motor 3, while achieving similar operational effects as described above.

In addition, although the motor driving monitoring circuit 61 monitors the voltages of the output terminals of the motor drive circuit 56, it can instead be constructed so as to monitor an input signal and an output signal of the gate drive circuit 57 (see FIG. 1). In this case, the function of monitoring the motor drive circuit 56 may not be sufficient as compared with the above-mentioned configuration, but the function of monitoring the motor control section 53b is satisfactory, and the second MCU 54 can function as a redundant system for the first MCU 53.

Moreover, it can be constructed such that a logic circuit (not shown) such as an AND gate is installed between the first MCU 53 and the gate drive circuit 57, so that an instruction from the first MCU 53 to the second MCU 54 can be interrupted by the second MCU 54.

Embodiment 2.

In the above-mentioned first embodiment (see FIG. 2), the respective control sections 53a, 53b are implemented on the first MCU 53, and the respective control verification sections 54a, 54b are implemented on the second MCU 54, but the control sections 53a, 53b and the control verification sections 54a, 54b can be implemented on individual MCUs, respectively.

Figure 6:
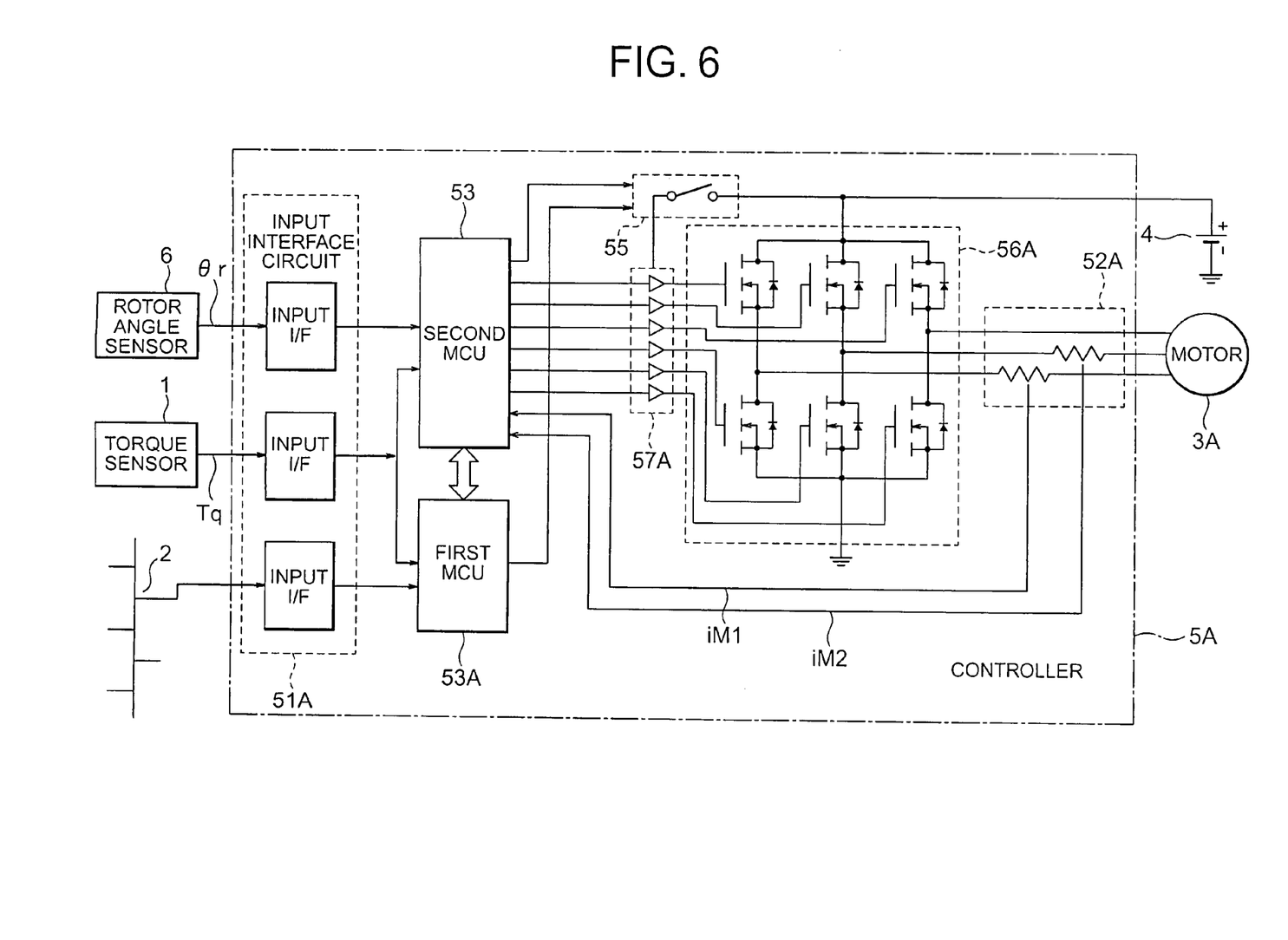
FIG. 6 is a circuit configuration diagram showing a steering control apparatus together with hardware blocks according to a second embodiment of the present invention.
Figure 7:
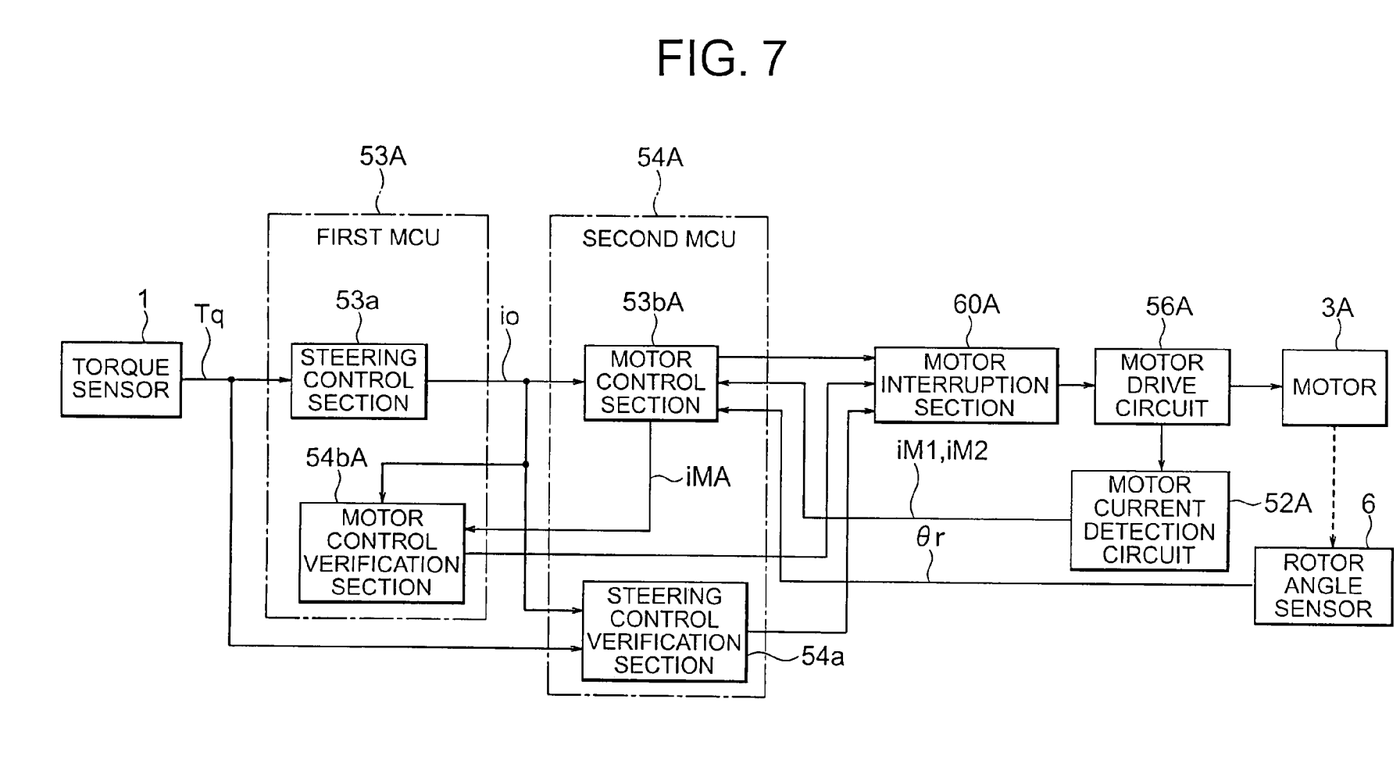
FIG. 7 is a block diagram showing a functional configuration to explain the software operation of a controller according to the second embodiment of the present invention.

FIG. 6 is a circuit configuration diagram that illustrates a steering control apparatus according to a second embodiment of the present invention, in which the control functions and the verification functions are distributed to separate MCUs, respectively. FIG. 7 is a block diagram that illustrates a functional configuration to describe the software operation of a controller 5A in FIG. 6.

In FIGS. 6 and 7, the parts or components same as those described above (see FIGS. 1 and 2) are identified by the same symbols or by the same symbols with "A" affixed to their ends, while omitting a detailed explanation thereof. In FIG. 6, a motor 3A is in the form of a three-phase DC brushless motor with a rotation angle sensor 6 mounted on the motor 3A. The rotation angle sensor 6 detects the rotor rotation angle θr of the motor 3A and inputs it to the controller 5A.

The rotor rotation angle θr thus detected is input to a second MCU 54A through an input interface circuit 51A. In this case, a switch element 55 in the controller 5A is arranged between a battery 4 and a gate drive circuit 57A. A motor current detection circuit 52A detects motor currents iM1, iM2 for two of three phases, and inputs them to the second MCU 54A. Here, note that a total sum of phase currents becomes "0", so a motor current for the remaining one phase can be obtained by arithmetic calculations.

Further, the second MCU 54A controls to drive the motor 3A, and supplies instruction signals for a motor drive circuit 56A to the respective gates of the power MOSFETs in the motor drive circuit 56A through the gate drive circuit 57A. The motor drive circuit 56A is comprised of three pairs (six pieces) of power MOSFETs for supplying electric power to the three-phase terminals of the motor 3A.

In FIG. 7, a motor interruption section 60A corresponds to the switch element 55 and the gate drive circuit 57A in FIG. 6. In this case, a steering control section 53a and a motor control verification section 54bA are implemented on the first MCU 53A, and a motor control section 53bA and a steering control verification section 54a are implemented on the second MCU 54A.

That is, the steering control section 53a and the motor control section 53bA are distributed to the first and second MCUs 53A, 54A, respectively, and similarly, the motor control verification section 54bA and the steering control verification section 54a are distributed to the first and second MCUs 53A, 54A, respectively.

The motor control section 53bA in the second MCU 54A controls the current supplied to the motor 3A based on a target current io and motor currents iM1, iM2 in a feedback manner. Also, the motor control section 53bA in the second MCU 54A calculates a detected current value iMA from the motor currents iM1, iM2, and inputs it to the motor control verification section 54bA in the first MCU 53A.

The motor control verification section 54bA verifies the validity or normality of the operation of the motor control section 53bA on the basis of the result of a comparison between the target current io and the detected current value iMA, and drives the motor interruption section 60A to interrupt the current supplied to the motor 3A when it is determined that the detected value iMA is abnormal.

That is, when a difference between the target current io and the current supplied to the motor 3A shows to be outside a predetermined range, the motor control verification section 54bA makes a determination that the motor control section 53bA is abnormal.

In this case, too, similar to the above, the steering control verification section 54a drives the motor interruption section 60A to interrupt the current supplied to the motor 3A when it is determined that the steering control section 53a is abnormal. Similarly, the motor control verification section 54bA drives the motor interruption section 60A to interrupt the current supplied to the motor 3A when it is determined that the motor control section 53bA is abnormal.

Now, reference will be made to the concrete operation of the steering control apparatus according to the second embodiment of the present invention as illustrated in FIGS. 6 and 7.

In FIG. 7, first of all, the target current io in dq coordinates calculated by the steering control section 53a is sent to the motor control section 53bA in the second MCU 54A.

The motor control section 53bA converts, through coordinate transformation, the motor currents iM1, iM2 (phase currents) from the motor current detection circuit 52A into a detected current value iMA in the form of a dc current on the dq coordinates based on the rotor rotation angle θr from the rotation angle sensor 6, whereby feedback control can be effected so as to make the detected current value iMA coincide with the target current io. Also, the motor control section 53b sends out the detected current value iMA to the motor control verification section 54bA in the first MCU 53A.

As a result, the motor control verification section 54bA compares the detected current value iMA with the target current io, and verifies the validity or normality of the motor control section 53bA by determining whether a difference (=iMA−io) therebetween is within a predetermined range.

On the other hand, the steering control verification section 54a in the second MCU 54A verifies the validity or normality of the operation of the steering control section 53a while setting the failure determination area based on the steering torque Tq and the target current io, as stated above (FIGS. 3 and 4).

Thus, in this second embodiment of the present invention, too, the steering control section 53a and the motor control verification section 54bA in the first MCU 53A and the motor control section 53bA and the steering control verification section 54a in the second MCU 54A control to mutually monitor or supervise their operations while mutually communicating the respective results of their arithmetic calculations to one another.

Thus, through an appropriate distribution of the arithmetic calculation loads of the first and second MCUs 53A, 54A, it is possible to avoid only either one of them from being excessively overloaded, thus making it possible to use inexpensive microcontrollers (MCUs). In addition, it is also possible to select appropriate processors that are suitable for respective processes, such as for example by using a DSP (Digital Signal Processor) as the second MCU 54A that implements the motor control section 53bA. As a consequence, an optimal controller design can be achieved.

Further, according to the configuration of FIG. 7, the first MCU 53A is provided with the steering control section 53a and the motor control verification section 54bA, and the second MCU 54A is provided with the motor control section 53bA and the steering control verification section 54a. Thus, this configuration is suitable for the case where the steering control apparatus is constructed by using the first MCU 53A for steering control and the second MCU 54A for motor control.

Although the steering control verification section 54a uses the steering torque Tq and the target current io so as to verify the steering control section 53a, as stated above (see FIG. 2), the detected current value iMA from the motor control section 53bA can be used in place of the target current io. In this case, the steering control verification section 54a can verify circuits such as the motor drive circuit 56A, as in the case of the motor control verification section 53bA.

Embodiment 3.

Although in the second embodiment, the detected current value iMA in the dq coordinates calculated by the motor control section 53bA is used as what is compared with the target current io in the motor control verification section 54bA, the motor currents iM1, iM2 (phase currents) from the motor current detection circuit 52A can instead be used directly.

For instance, when the motor 3A is driven by the use of a sine wave, a sum of phase currents for three phases becomes "0", and hence the validity or normality of the motor control section 53bA can be verified by determining whether a sum of phase currents for the three phases is within a predetermined range that includes "0" as a center value. In addition, this can also be verified by determining whether each of the phase currents is within a predetermined range.

Moreover, in the above-mentioned second embodiment, the detected current value iMA after coordinate transformation is calculated by using the detected rotor rotation angle θr, and the rotor rotation angle θr is indirectly used for verification when the detected current value iMA is monitored by the motor control verification section 54bA, but the rotor rotation angle θr can be directly used for verification. In this case, the motor control verification section 54bA will verify the operation of the motor control section 53bA on the basis of the rotor rotation angle θr of the motor 3A.

For instance, when the time change rate of the rotor rotation angle θr (i.e., the angular velocity of the motor rotor) is within a predetermined range that includes "0" as a center value (i.e., the motor is not substantially rotating) in spite of that a current greater than a predetermined value is flowing through the motor 3A, a determination can be made that the motor control section 53bA is abnormal. That is, the motor control verification section 54bA verifies the operation of the motor control section 53bA on the basis of the rotor angular velocity of the motor 3A. In this case, a seizure of the rotor of the motor 3A can be directly monitored.

As described above, according to the steering control apparatus of the present invention, a redundant system for monitoring from an input system for sensor signals, etc., to an output system for control signals, etc., can be constructed at low cost in a reliable manner.

Although in the above-mentioned respective embodiments, reference has been made to the case in which the present invention is applied to an electric power steering apparatus, it is needless to say that a redundant system can be constructed which is applicable to not only such an electric power steering apparatus but also various steering control apparatuses while providing similar operational effects. In addition, although the present invention has been applied to the steering control apparatus for a vehicle such as an automobile, similar operational effects can also be achieved even if applied to other steering control apparatuses for ships or the like.

While the invention has been described in terms of preferred embodiments, those skilled in the art will recognize that the invention can be practiced with modifications within the spirit and scope of the appended claims.

What is claimed is:

1. A steering control apparatus comprising:
 a torque sensor that detects a driver's steering force as a steering torque;
 a motor that provides torque to a steering system;
 a motor drive circuit that drives said motor;
 a steering control section that receives said steering torque from said torque sensor and calculates at least a target current for said motor based on said steering torque;
 a motor control section that receives said target current from said steering control section and provides an instruction to said motor drive circuit based on said target current;
 a steering control verification section that receives said steering torque from said torque sensor and receives said target current from said steering control section and verifies an operation of said steering control section based on said steering torque and said target current; and
 a motor control verification section that receives a state quantity from said motor drive circuit and verifies an operation of said motor control section based on said state quantity.

2. The steering control apparatus as set forth in claim 1, further comprising:
 a first and a second control section each including at least one of said steering control section, said motor control section, said steering control verification section, and said motor control verification section;
 wherein said torque sensor and said motor drive circuit have their output terminals connected to said first and second control sections, respectively.

3. The steering control apparatus as set forth in claim 1, further comprising:
 a first and a second control section each including at least one of said steering control section, said motor control section, said steering control verification section, and said motor control verification section;
 wherein the steering torque detected by said torque sensor and said state quantity input to said motor control section or said motor control verification section are input to said first and second control sections, respectively.

4. The steering control apparatus as set forth in claim 2, wherein
 said first control section includes said steering control section and said motor control section; and said second control section includes said steering control verification section and said motor control verification section.

5. The steering control apparatus as set forth in claim 2, wherein
said first control section includes said steering control section and said motor control verification section; and
said second control section includes said motor control section and said steering control verification section.

6. The steering control apparatus as set forth in claim 1, wherein
said steering control verification section sets a reference value that verifies said target current based on said steering torque, and determines that the steering control section is abnormal, when said target current exceeds said reference value.

7. The steering control apparatus as set forth in claim 4, wherein
said steering control verification section sets a plurality of reference values for comparison verification of said target current based on said steering torque; and
said second control section selects one of said plurality of reference values in accordance with an instruction from said first control section, determines that said steering control section is abnormal, when said target current exceeds the reference value thus selected, and restricts a period of time in which at least one of said plurality of reference values is in a selected state.

8. The steering control apparatus as set forth in claim 5, wherein
said steering control verification section sets a plurality of reference values for comparison verification of said target current based on said steering torque;
said second control section selects one of said plurality of reference values in accordance with an instruction from said first control section, determines that said steering control section is abnormal, when said target current exceeds the reference value thus selected, and restricts a period of time in which at least one of said plurality of reference values is in a selected state.

9. The steering control apparatus as set forth in claim 4, wherein
said steering control verification section sets a plurality of reference values for comparison verification of said target current based on said steering torque;
said second control section selects one of said plurality of reference values in accordance with an instruction from said first control section, and determines that said steering control section is abnormal, when said target current exceeds the reference value thus selected; and
said first control section provides said reference value selection instruction to said second control section in accordance with a predetermined periodic signal.

10. The steering control apparatus as set forth in claim 5, wherein
said steering control verification section sets a plurality of reference values for comparison verification of said target current based on said steering torque;
said second control section selects one of said plurality of reference values in accordance with an instruction from said first control section, and determines that said steering control section is abnormal, when said target current exceeds the reference value thus selected; and
said first control section provides said reference value selection instruction to said second control section in accordance with a predetermined periodic signal.

11. The steering control apparatus as set forth in claim 1, wherein
said motor control verification section verifies an operation of said motor control section based on a voltage impressed on said motor by said motor drive circuit.

12. The steering control apparatus as set forth in claim 11, wherein
when a sum of the values of voltages impressed by said motor drive circuit on respective terminals of said motor is outside a predetermined range, said motor control verification section determines that said motor control section is abnormal.

13. The steering control apparatus as set forth in claim 11, wherein
said motor control section drives said motor in a PWM fashion; and
when the period of a PWM signal impressed by said motor drive circuit on respective terminals of said motor is outside a predetermined range, said motor control verification section determines that said motor control section is abnormal.

14. The steering control apparatus as set forth in claim 1, wherein
said motor control verification section verifies an operation of said motor control section based on a current supplied to said motor.

15. The steering control apparatus as set forth in claim 14, wherein
said motor comprises a three-phase motor; and
when a sum of the values of currents supplied from said motor drive circuit to respective phases of said motor is outside a predetermined range, said motor control verification section determines that said motor control section is abnormal.

16. The steering control apparatus as set forth in claim 14, wherein
when a difference between said target current and a current supplied to said motor is outside a predetermined range, said motor control verification section determines that said motor control section is abnormal.

17. The steering control apparatus as set forth in claim 1, wherein
said motor control verification section verifies an operation of said motor control section based on a rotor rotation angle of said motor.

18. The steering control apparatus as set forth in claim 1, wherein
said motor control verification section verifies an operation of said motor control section based on a rotor angular velocity of said motor.

19. The steering control apparatus as set forth in claim 1, wherein
said steering control verification section interrupts the current supplied to said motor when it is determined that said steering control section is abnormal.

20. The steering control apparatus as set forth in claim 1, wherein
said motor control verification section interrupts a current supplied to said motor when it is determined that said motor control section is abnormal.

21. A steering control apparatus comprising:
a torque sensor that detects a driver's steering force as a steering torque;
a motor that provides torque to a steering system;
a motor drive circuit that drives said motor;
a steering control section that receives said steering torque from said torque sensor and calculates at least a target current for said motor based on said steering torque;

a motor control section that receives said target current from said steering control section and provides an instruction to said motor drive circuit based on said target current; and a steering control verification section that receives said steering torque from said torque sensor and receives said target current from said steering control section and verifies an operation of said steering control section based on said steering torque and said target current.

22. The steering control apparatus as set forth in claim 21, wherein said steering control verification section sets a reference value that verifies said target current based on said steering torque, and determines that the steering control section is abnormal, when said target current exceeds said reference value.

* * * * *